(12) United States Patent
Ohta et al.

(10) Patent No.: US 6,309,777 B1
(45) Date of Patent: Oct. 30, 2001

(54) EXPLOSION-RESISTANT LARGE CAPACITIVE LITHIUM ION SECONDARY BATTERY

(75) Inventors: Tomoyuki Ohta; Masato Shirakata, both of Tokyo; Hajime Satoh, Kanagawa, all of (JP)

(73) Assignees: NEC Corporation, Tokyo; NEC Moli Energy Corporation, Kanagawa, both of (JP)

( * ) Notice: Subject to any disclaimer, the term of this patent is extended or adjusted under 35 U.S.C. 154(b) by 0 days.

(21) Appl. No.: 09/273,529

(22) Filed: Mar. 22, 1999

(30) Foreign Application Priority Data

Mar. 20, 1998 (JP) .................................................. 10-072739

(51) Int. Cl.$^7$ ............................. H01M 4/02; H01M 4/60; H01M 4/62; H01M 6/04; H01M 10/12

(52) U.S. Cl. ......................... 429/211; 429/212; 429/214; 429/232; 429/126

(58) Field of Search ................................... 429/211, 212, 429/214, 232, 126

(56) References Cited

U.S. PATENT DOCUMENTS

| | | | |
|---|---|---|---|
| 5,326,656 | * 7/1994 | Meadows et al. | 429/178 |
| 5,821,012 | * 10/1998 | McCullough | 429/209 |
| 5,998,051 | * 12/1999 | Poirier et al. | 429/7 |
| 6,001,139 | * 12/1999 | Asanuma et al. | 29/623.3 |
| 6,051,341 | * 4/2000 | Terasaki | 429/234 |
| 6,077,623 | * 6/1998 | Grosvenor et al. | 429/210 |
| 6,114,059 | * 9/2000 | Watanabe et al. | 429/120 |

FOREIGN PATENT DOCUMENTS

| | | |
|---|---|---|
| 61-204360 | 12/1986 | (JP) . |
| 62-88369 | 6/1987 | (JP) . |
| 62-183365 | 11/1987 | (JP) . |
| 5-74436 | 3/1993 | (JP) . |
| 9-298054 | 11/1997 | (JP) . |

* cited by examiner

*Primary Examiner*—Steven P. Griffin
*Assistant Examiner*—Jonas N. Strickland
(74) *Attorney, Agent, or Firm*—Young & Thompson

(57) ABSTRACT

An active material free part of a positive electrode is coated with an over-coat material, wherein the over-coat material has at least one of the following properties: suppression of heat transfer from the second part of the electrode to the separator; reduction of a heat transfer rate from the second part of the electrode to the separator; prevention of transfer of excess heat from the second part of the electrode to the separator; electrical isolation of the second part of the electrode from the separator; prevention of charges generated in the first active material from becoming concentrated in the second part of the electrode and discharged from the second part; and prevention of the separator from being melted by a current discharge from or into the second part of the electrode through the separator until the current discharge is shut down by a fuse function of the separator.

17 Claims, 10 Drawing Sheets

CONVENTIONAL LITHIUM ION SECONDARY BATTERY

EXPLOSION-RESISTANT LARGE CAPACITIVE LITHIUM ION SECONDARY BATTERY

BACKGROUND OF THE INVENTION

The present invention relates to a re-chargeable secondary battery, and more particularly to a explosion-resistant re-chargeable secondary battery having an improved positive electrode structure.

In Japanese laid-open patent publication No. 5-74436, a winding-structured lithium ion secondary battery is disclosed, wherein positive and negative electrodes comprise metal foils coated with an active material and provided with metal tabs connected to electrode terminals and the positive and negative electrodes are separated by a separator which has a property of shut down to a short circuit current.

In Japanese utility model application No. 61-71369, a battery is disclosed, wherein a sharp end portion of a porous core body is covered with a polyethylene tetrafluoride film or a polyester based resin film or a glass fiber film in order to prevent the sharp end portion of the porous core body from penetrating through a separator.

In Japanese utility model application No. 61-180902, a battery is disclosed, wherein a sharp end portion of a porous core body is covered with a fluorine resin film or a glass fiber film in order to prevent the sharp end portion of the porous core body from penetrating through a separator.

In Japanese utility model application No. 60-88225, a battery is disclosed, wherein a sharp end portion of a punched metal body is covered with a fluorine resin film or a glass fiber film in order to prevent the sharp end portion of the punched metal body from penetrating through a separator.

In Japanese laid-open patent publication No. 9-298054, a lithium ion secondary battery is disclosed, wherein an active material coating a positive electrode comprises a lithium manganate having a spinel structure.

The above prior arts are directed to prevent the electrode from penetrating through the separator and from contacting the opposite electrode to form a short circuit.

The above conventional lithium ion secondary battery has sufficient safety under normal states. However, if the above conventional lithium ion secondary battery is over-charged and has a current discharge between the positive and negative electrode through the separator, a temperature of the porous separator is increased and softened and melted, whereby the pores of the porous separator are closed to suppress ions from transferring through the porous-closed separator. As a result, the current between the positive and negative electrodes is reduced whereby the temperature is not increased up to the critical temperature which may case ignition of the battery Namely, the current is shut down.

In recent years, however, the lithium ion secondary battery has been developed in capacity for applicability to a large current usage condition. As the capacity of the battery is increased, the heat generation amount and the heat generation rate are increased so that the temperature of the battery is rapidly increased which causes the separator to completely melt to form a hole in the separator without causing the separator to exhibit a fuse function to close the pores of the separator due to slight melting of the separator. The formation of the hole in the separator allows the discharge current between the positive and negative electrode, whereby a further rapid temperature increase is caused, whereby an ignition or an explosion may appear. So long as it is required for advanced lithium ion secondary battery to increase their capacity as much as possible, the above problems with rapid increase in temperature of the battery are remarkable and serious to the advanced lithium ion secondary battery.

In the above circumstances, it had been required to develop a novel large capacitive secondary battery having sufficient safety not only in normal states but also in abnormal states such as over-charged states.

SUMMARY OF THE INVENTION

Accordingly, it is an object of the present invention to provide a novel battery free from the above problems.

It is a further object of the present invention to provide a novel large capacitive secondary battery having a sufficient safety not only in the normal states but also in abnormal states such as over-charged states.

It is a still further object of the present invention to provide a novel positive electrode structure of a large capacitive secondary battery having sufficient safety not only in normal states but also in abnormal states such as over-charged states.

In accordance with the present invention, an active material free part of a positive electrode is coated with an over-coat material, wherein the over-coat material has at least one of the following properties: suppression of heat transfer from the second part of the electrode to the separator; reduction of a heat transfer rate from the second part of the electrode to the separator; prevention of transfer of excess heat from the second part of the electrode to the separator; electrical isolation of the second part of the electrode from the separator; prevention of charges generated in the first active material from becoming concentrated in the second part of the electrode and discharged from the second part; and prevention of the separator from being melted by a current discharge from or into the second part of the electrode through the separator until the current discharge is shut down by a fuse function of the separator.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DESCRIPTION OF THE PREFERRED EMBODIMENT

Figure 1:
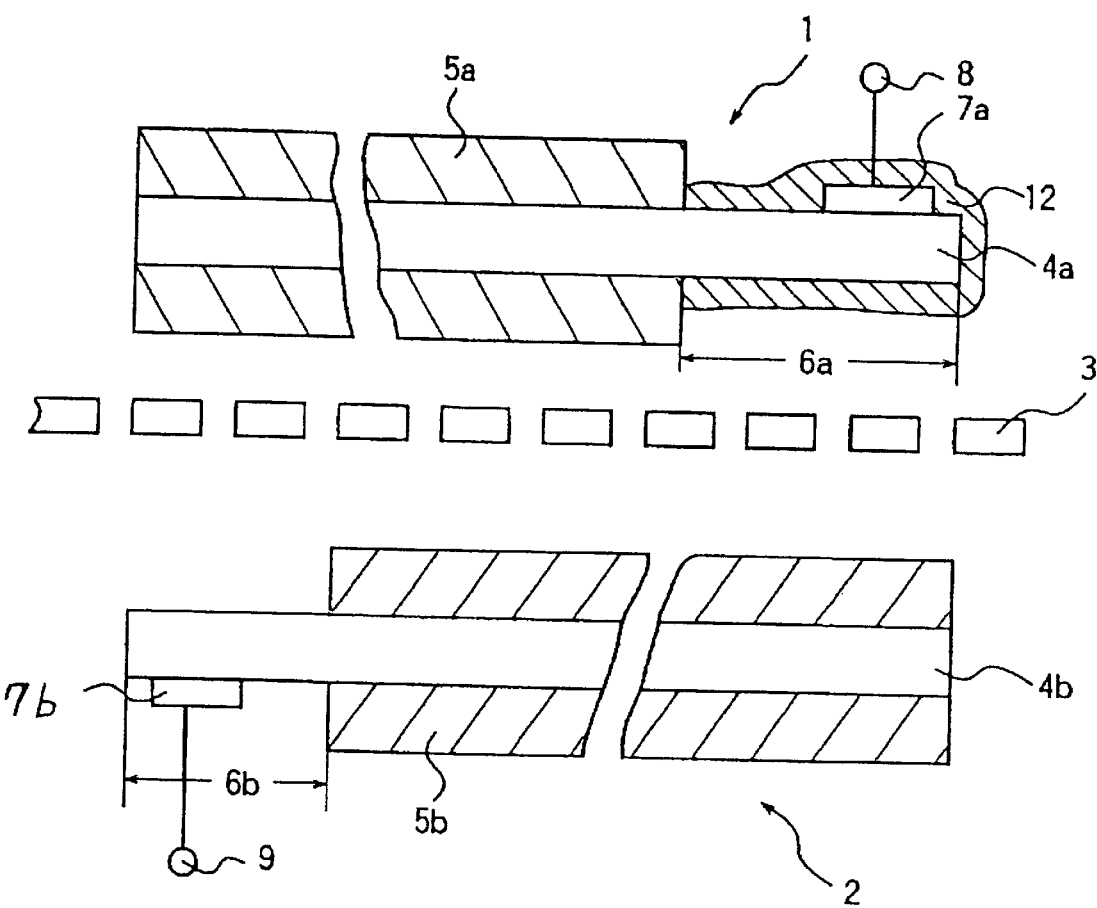
FIG. 1 is a schematic view illustrative of a novel positive electrode structure separated by a separator from a negative electrode in a novel lithium ion secondary battery in accordance with the present invention.

The first aspect of the present invention provides an electrode structure comprising: a first part coated with a first active material and a second part connected to an electrode terminal; and an over-coat material coating at least the second part of the electrode, wherein the over-coat material suppresses heat transfer from the second part of the electrode to an adjacent separator through an inter-space.

It is preferable that the over coat material reduces a heat transfer rate from the second part of the electrode to the separator through the inter-space.

It is also preferable that the over coat material prevents transfer of excess heat from the second part of the electrode to the separator through the inter-space.

It is also preferable that the over coat material electrically isolates the second part of the electrode from the separator.

It is also preferable that the over coat material prevents charges generated in the first active material from becoming concentrated in the second part of the electrode and discharged from the second part.

It is also preferable that the over coat material prevents the separator from being melted by a current discharge from or into the second part of the electrode through the separator until the current discharge is shut down by a fuse function of the separator.

It is also preferable that the first active material comprises a lithium manganate having a spinel structure.

It is also preferable that the electrode comprises a metal foil.

The above electrode structure is applicable to an explosion-resistant secondary battery having at least one positive electrode, at least one negative electrode and at least one separator separating the positive electrode from the negative electrode, wherein at least the positive electrode has the above electrode structure.

It is also preferable to further comprise a spiral structure of laminations of the positive electrode, the separator and the negative electrode which are sheet-shaped, so that the second part of the positive electrode has a positive electrode terminal tub connected to a positive electrode terminal and the positive electrode terminal tub is positioned at an innermost spiral position, and the over-coat material is disposed between the second part and the separator surrounding the second part.

It is also preferable that the negative electrode comprises a third part coated with a second active material and a fourth part having a negative electrode terminal tub connected to a negative electrode terminal and the negative electrode terminal tub is positioned at an outermost spiral position.

The second aspect of the present invention provides an electrode structure comprising: a first part coated with a fast active material and a second part connected to an electrode terminal; and an over-coat material coating at least the second part of the electrode, wherein the over-coat material has at least one of the following properties: suppression of heat transfer from the second part of the electrode to the separator; reduction of a heat transfer rate from the second part of the electrode to the separator prevention of transfer of excess heat from the second part of the electrode to the separator; electrical isolation of the second part of the electrode from the separator; prevention of charges generated in the first active material from becoming concentrated in the second part of the electrode and discharged from the second part; and prevention of the separator from being melted by a current discharge from or into the second part of the electrode through the separator until the current discharge is shut down by a fuse function of the separator.

It is also preferable that the first active material comprises a lithium manganate having a spinel structure.

It is also preferable that the electrode comprises a metal foil.

The above electrode structure of the second present invention is applicable to an explosion-resistant secondary battery having at least one positive electrode, at least one negative electrode and at least one separator separating the positive electrode from the negative electrode, wherein at least the positive electrode has the electrode structure.

It is also preferable to further comprise a spiral structure of laminations of the positive electrode, the separator and the negative electrode which are sheet-shaped, so that the second part of the positive electrode has a positive electrode terminal tub connected to a positive electrode terminal and the positive electrode terminal tub is positioned at an innermost spiral position, and the over-coat material is disposed between the second part and the separator surrounding the second part.

It is preferable that the negative electrode comprises a third part coated with a second active material and a fourth part having a negative electrode terminal tub connected to a negative electrode terminal and the negative electrode terminal tub is positioned at an outermost spiral position.

With reference to FIG. 1, more concrete descriptions of the above present invention will be made by taking one typical example of a lithium ion secondary battery having an improved positive electrode.

The lithium ion secondary battery has a positive electrode 1, a negative electrode 2 and a separator 3 which separates the positive electrode 1 from the negative electrode 2.

The separator 3 exhibits a fuse function to a current between the positive electrode 1 and the negative electrode 2. The positive electrode 1 comprises a metal foil 4a having a first part coated with an active material 5a and a second part 6a which is not coated with the active material 5a. The negative electrode 2 comprises a metal foil 4b having a first part coated with an active material 5b and a second part 6b which is not coated with the active material 5b. Each of the metal foils 4a and 4b has a stripe-shape. A tub 7a (also referred to as an electrode pad) is provided on the second part 6a of the positive electrode 1 so that the tub 7a is electrically connected to a positive electrode terminal 8. A tub 7b (also referred to as an electrode pad) is provided on the second part 6b of the negative electrode 2 so that the tub 7b is electrically connected to a negative electrode terminal 9.

The second part 6a of the metal foil 4a of the positive electrode 1 and the tub 7a are coated with an over-coat material 12, so that the positive electrode terminal 8 projects from the over-coat material 12. Namely, the over-coat material 12 coats the metal foil 4a of the positive electrode 1 except for the part coated with the active material 5a. The active material 5a and the over-coat material 12 are spaced from the separator 3. The metal foil 4a of the positive electrode 1 is isolated by the active material 5a and the over-coat material 12 from the separator 3.

Even the second part 6b of the metal foil 4b of the positive electrode 1 and the tub 7b are coated with an over-coat material. However, as a modification, it is possible that the second part 6b of the metal foil 4b of the positive electrode 1 and the tub 7b are coated with an over-coat material, so that the negative electrode terminal 9 projects from the over-coat material.

The over-coat material 12 suppresses heat transfer from the second part 6a of the metal foil 4a of the positive electrode 1 to the separator 3. The over-coat material 12 reduces a heat transfer rate from the second part 6a of the metal foil 4a of the positive electrode 1 to the separator 3. The over-coat material 12 prevents transfer of excess heat from the second part 6a of the metal foil 4a of the positive electrode 1 to the separator 3. The over-coat material 12 electrically isolates the second part 6a of the metal foil 4a of the positive electrode 1 from the separator 3. The over-coat material 12 prevents charges generated in the active material 5a from becoming concentrated in the second part 6a of the metal foil 4a of the positive electrode 1 and flowed from the second part 6a through the separator 3 to the negative electrode 2. The over-coat material 12 prevents the separator 3 from being melted by a current discharge from or into the second part 6a of the metal foil 4a of the positive electrode 1 through the separator 3 until a short circuit current discharge between the positive electrode 1 and the negative electrode 2 is shut down by a fuse function of the separator 3.

The second part 6a of the metal foil 4a could not be coated with the active material 5a to enable the tub 7a to be welded onto the second part 6a of the metal foil 4a for obtaining an electrical connection to the positive electrode terminal 8. Contrary to the present invention, if the second part 6a of the metal foil 4a of the positive electrode 1 is not coated with the over-coat material 12, then the second part 6a of the metal foil 4a of the positive electrode 1 is exposed to the separator 3 through an inter-space or the second part 4a and the tub 7a may be made contact with the separator 3 if the battery is accommodated within a battery case. If the second part 6a of the metal foil 4a of the positive electrode 1 is exposed to the separator 3 through an inter-space or the second part 4a and the tub 7a may be made contact with the separator 3, then his allows a large heat from the second part 6a of the metal foil 4a of the positive electrode 1 to an adjacent part or contact part of the separator 3 adjacent to or contact with the second part 6a. If the battery enters into an abnormal state due to over-charge or short circuit formation, excess heat is generated at the second part 6a of the metal foil 4a of the positive electrode 1 and this excess heat is allowed to be transferred to the adjacent part or contact part of the separator 3 if no over-coat material is provided on the second part 6a of the metal foil 4a of the positive electrode 1. As a result, the adjacent part of the separator 3 adjacent to the second part 6a of the metal foil 4a of the positive electrode 1 receives a largest heat transfer from the second part 6a, whereby the second part 6a of the metal foil 4a of the positive electrode 1 may be melted most remarkably. This is most remarkable if the active material 5a coating the first part of the metal foil 4a is made of lithium manganate having a spinel structure. These mechanisms are as follows. The active material 5a generates electrons and these electrons are concentrated into the tub 7a and the second part 6a of the metal foil 4a of the positive electrode 1, for which reason the heat generation is large on the tub 7a and the second part 6a. Further, the active material 5a has a relatively small heat conductivity. For those reasons, a heat transfer from the second part 6a of the metal foil 4a of the positive electrode 1 toward the separator 3 is much larger than a heat transfer from the first part coated by the active material 5a. If, contrary to the present invention, the second part 6a is exposed to or in contact with the separator 3, the heat generation due to the over-charge or short circuit formation causes the separator 3 to perform a fuse function, whereby a rapid and great increase in temperature of the second part 6a and the tub 7a causes a rapid and large heat transfer from the second part 6a and the tub 7a to the adjacent part of the separator 3, whereby the adjacent part of the separator 3 is melted without showing the fuse function to shut down the current between the positive and negative electrodes 1 and 2 through the separator 3. As a result of the adjacent part of the separator 3 having once been melted, a short circuit is formed between the positive and negative electrodes 1 and 2. The short circuit formation causes a further larger current between the positive and negative electrodes 1 and 2, whereby the heat generation is further accelerated, resulting in ignition of the battery.

In order to avoid the above problem, in accordance with the present invention, the over-coat material 12 is provided to coat the second part 6 and the tub 7a except for the first part coated with the active material 5a, so that the overcoat material 12 provides electrical and thermal isolations between the second part 6a of the metal foil 4a of the positive electrode 1 from the adjacent part of the separator 3. Even if the battery enters into the abnormal states such as over-charge or short circuit formation, then the over-coat material 12 prevents the current between the second part 6a of the metal foil 4a of the positive electrode 1 and the negative electrode 2 and also prevents the heat transfer from the second part 6a toward the adjacent part of the separator 3, thereby preventing the adjacent part of the separator 3 from receiving a large heat transfer from the second part 6a of the metal foil 4a of the positive electrode 1. As a result, the adjacent part of the separator 3 is not melted. Other part of the separator 3 than the adjacent part is faced to the active material 5a, whereby a shut down appears on the other part of the separator 3. As a result, the current between the positive electrode 1 and the negative electrode 2 is discontinued, for which reason no short circuit is formed between the positive and negative electrodes 1 and 2. No short circuit formation causes no current between the positive and negative electrodes 1 and 2, whereby no ignition appears on the battery. Polyimide, PPS and PP are available as the over-coat material 12.

Figure 2:
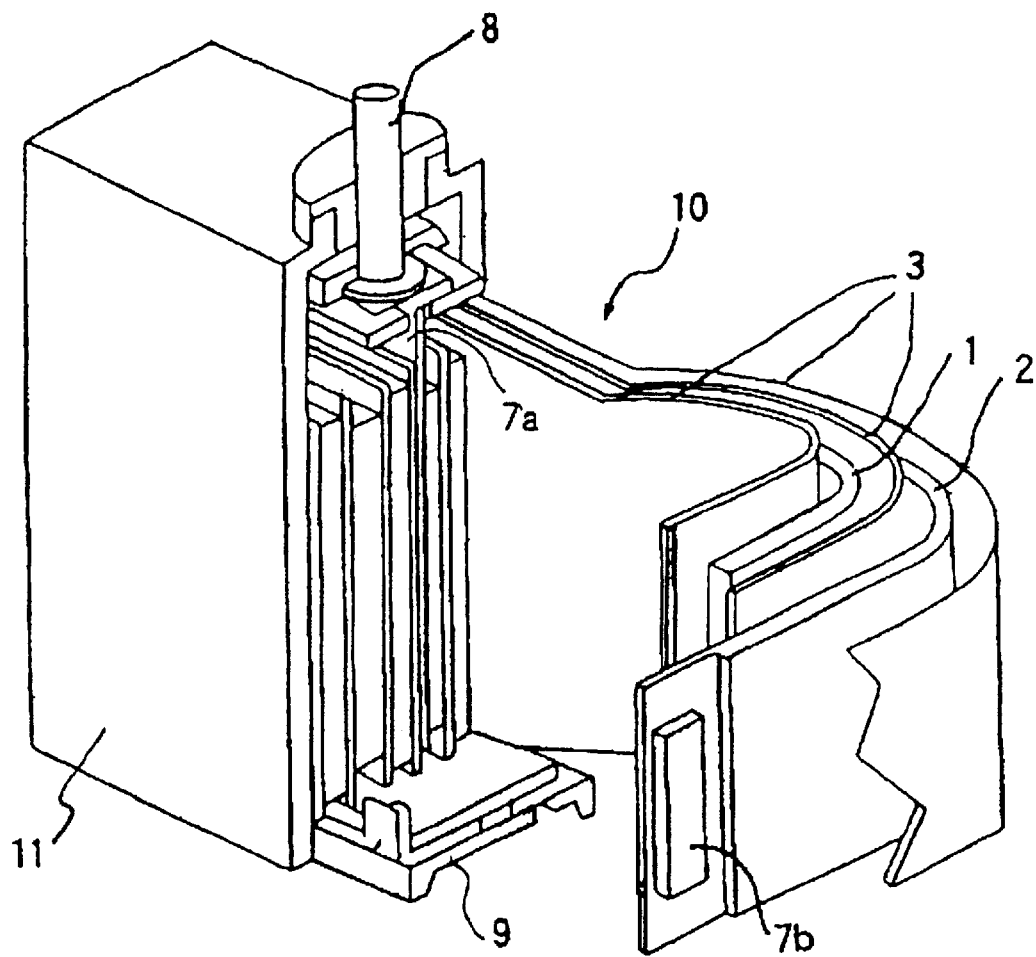
FIG. 2 is a perspective view illustrative of a structure of a novel lithium ion secondary battery in a preferred embodiment in accordance with the present invention.
Figure 3A:
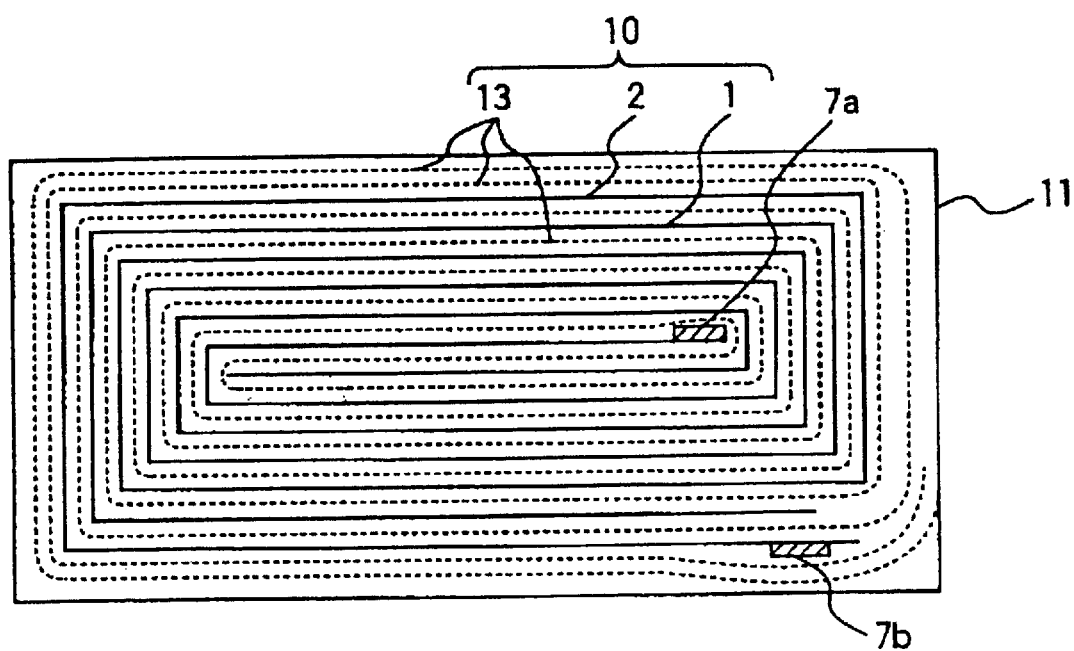
FIG. 3A is a fragmentary enlarged view illustrative of a multiple winding structure in a battery case of a novel lithium ion secondary battery in a preferred embodiment in accordance with the present invention.

The structure of the lithium ion secondary battery will subsequently be described with reference to FIG. 2. The lithium ion secondary battery is accommodated within a battery case 11. The positive electrode terminal 8 projects from the top of the battery case 11. The negative electrode terminal 9 is positioned at the bottom of the battery case 11. The positive electrode terminal 8 is connected with the tub 7a which is positioned at a center of the battery case 11. The negative electrode terminal 9 is connected with the tub 7b which is positioned at a peripheral position of the battery case 11. The lithium ion secondary battery has a multiple winding structure 10 of laminations of the positive electrode 1, the separator 3 and the negative electrode 2, so that each of the positive electrode 1 and the negative electrode 2 is sandwiched between the separators 2. This multiple winding structure is immersed in an electrolytic solution and accommodated in the battery case 11. The multiple winding structure is wounded in a rectangular form as illustrated in FIG. 3A. However, it is possible to modify this rectangular shape of the winding into circle or other geometrical shapes. The tub 7a and the second part 6a of the metal foil 4a of the positive electrode 1 are positioned on the innermost track of the multiple winding structure and thus positioned in the vicinity of a longitudinal line of the battery case 11. The tub 7b provided on the second part 6b of the metal foil 4b of the positive electrode 1 is positioned on the outermost track of the multiple winding structure and thus positioned in the vicinity of one corner of the battery case 11.

Figure 3B:
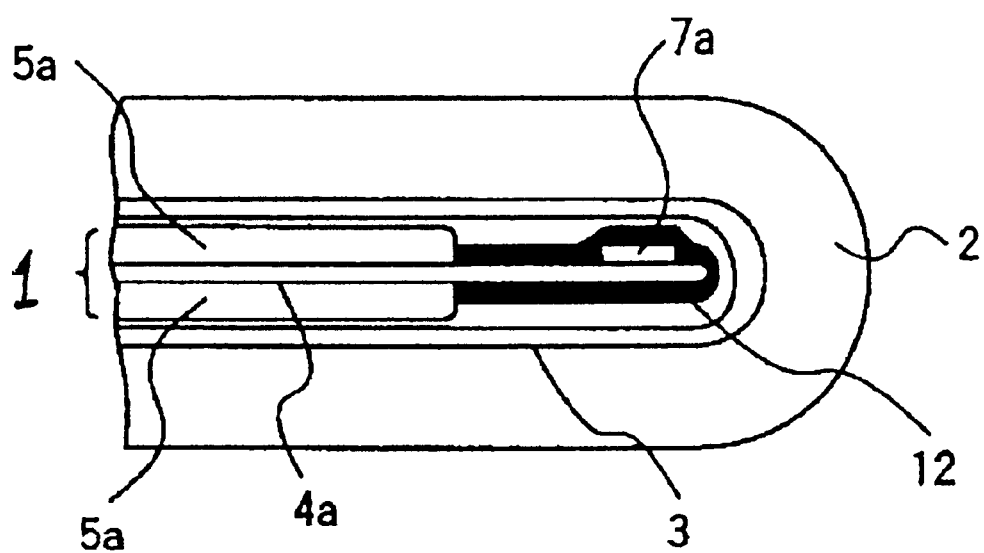
FIG. 3B is a fragmentary enlarged view illustrative of an active material free positive electrode part which is coated with an over-coat material in a multiple winding structure in a battery case of a novel lithium ion secondary battery in a preferred embodiment in accordance with the present invention.

As illustrated in FIG. 3B, the first part of the metal foil 4a of the first electrode 1 is coated with the active material 5a. The second part 6a of the metal foil 4a of the first electrode 1 is provided with the tub 7a and the tub 7a and the second part 6a are coated with the over-coat material 12. The end of the second part 6a and the tub 7a are surrounded by the separator 3 which is further surrounded by the metal foil 6b of the second electrode 2.

The metal foil 4a of the positive electrode 1 may, for example, comprise an aluminum foil. The active material 5a, which coats the first part of the aluminum foil 4a, may comprise lithium manganate, lithium cobalt acid, transition metal oxides such as lithium nickel acid and polymers such as disulfides.

The metal foil 4b of the negative electrode 2 may comprise a copper foil. The active material 5b, which coats the first part of the copper foil 4b, may, for example, comprise graphitized carbons such as a natural graphite, a graphitized MCMB, and a graphitized MCF, non-graphitized carbons having amorphous structure, tin compounds lithium metals and lithium alloys.

The separator 3 exhibits the fuse function to the current between the positive and negative electrodes 1 and 2. The separator 3 is made soften and melted by temperature increase in the battery, so as to reduce or shut down the short circuit current between the positive and negative electrodes 1 and 2. The separator 3 may, for example, comprise polyethylene, polypropylene, a porous membrane of polyethylene and polypropylene layered laminations, and a porous membrane of complex thereof.

The electrolytic solution or electrolyte, into which the above multiple winding structure is immersed, may comprise a non-aqueous electrolyte which may be prepared by dissolving a mixture solvent with 0.5–2.0 mol/liter of imide salts and methide salts. The mixture solvent may include ring carbonates such as ethylene carbonates and propylene carbonates, and straight chain carbonates such as diethyl carbonate and dimethyl carbonate, ester carboxylic acids such as methyl acetate, ethyl acetate, methyl propionic acid and ethyl propionic acid, and organic substances such as gamma-butyrolactone. The imide salt may, for example, be lithium phosphate hexafluoride, lithium borate tetrafluoride, lithium perchlorate, bis(trifluoromethylsulfon)imide, and bis (penta-fluoroethylsulfon)imide.

Over-charge test of the following lithium ion secondary battery have been made for examination and evaluation on the battery.

The positive electrode 1 coated with the active material 5a was made as follows. 93% by weight of lithium manganate having a spinel structure is mixed with 3% by weight of acetylene black as a donor and 4% by weight of polyvinylidene fluoride as a binder. This mixture was then dispersed into an NMP to prepare a positive electrode slurry. This slurry was applied on opposite sides of a 20-micron thick aluminum foil. The NMP was evaporated and the remainder was further dried and solidified for subsequent compression molding to form the positive electrode 1 which is illustrated in FIGS. 4A and 4B.

Figure 4A:
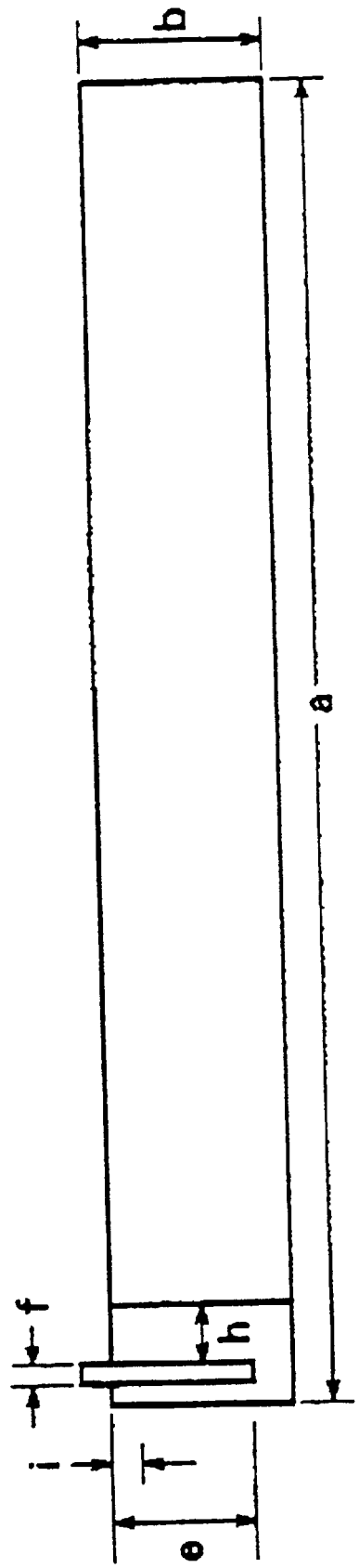
FIG. 4A is a plan view illustrative of a dimensions and structure of a positive electrode of a novel lithium ion secondary in a preferred embodiment in accordance with the present invention.
Figure 4B:
FIG. 4B is a side view illustrative of a dimensions and structure of a positive electrode of a novel lithium ion secondary in a preferred embodiment in accordance with the present invention.

The dimensions or sizes of the positive electrode 1 illustrated in FIGS. 4A and 4B are as follows.

A length "a" of the positive electrode 1 is 676 millimeters. A width "b" of the positive electrode 1 is 57.7 millimeters. A length "c" of a tub-provided surface of the second part 6a of the positive electrode 1 is 18 millimeters. A length "d" of a tub-free surface of the second part 6a of the positive electrode 1 is also 18 millimeters. A length "e" of the tub 7a is about 70 millimeters. A width "f" of the tub 7a is 4 millimeters. A thickness "g" of the tub 7a is 0.1 millimeter. A distance "h" of the tub 7a from a boundary between the active material free second part and the active material coated first part of the positive electrode is 11 millimeters. A length "i" of a projecting part of the tub 7a from a side of the positive electrode 1 is 12.4 millimeters. A thickness "j" of the metal foil of the positive electrode 1 is 20 micrometers. A total thickness "k" of the positive electrode 1 is 179 micrometers.

The negative electrode 2 coated with the active material 5b was made as follows. 93% by weight of graphitized meso-carbon micro beads is mixed with 7% by weight of polyvinylidene fluoride as a binder. This mixture was then dispersed into an NMP to prepare a negative electrode slurry. This slurry was applied on opposite sides of a 10-micron thick copper foil. The NMP was evaporated and the remainder was further dried and solidified for subsequent compression molding to form the negative electrode 2 which is illustrated in FIGS. 4C and 4D.

Figure 4C:
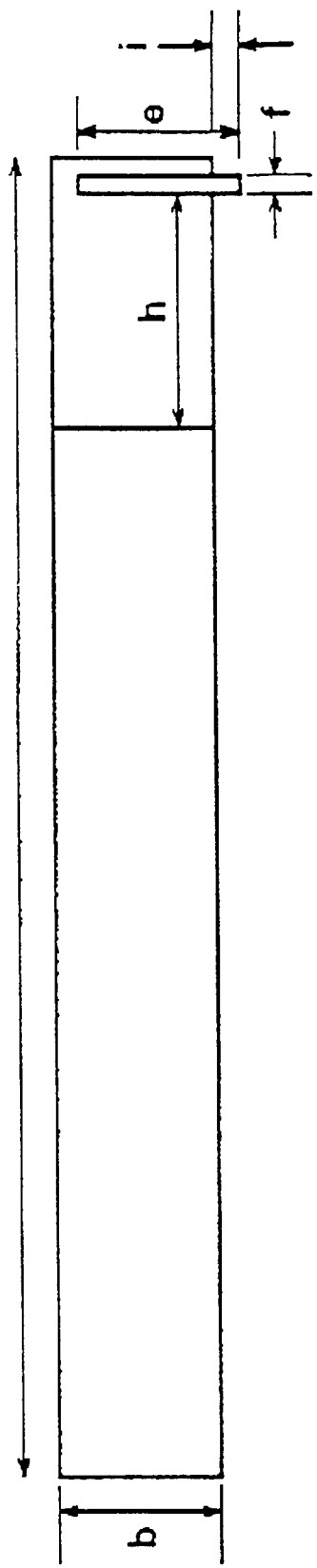
FIG. 4C is a plan view illustrative of a dimensions and structure of a positive electrode of a conventional lithium ion secondary in a comparative example to the preferred embodiment in accordance with the present invention.
Figure 4D:
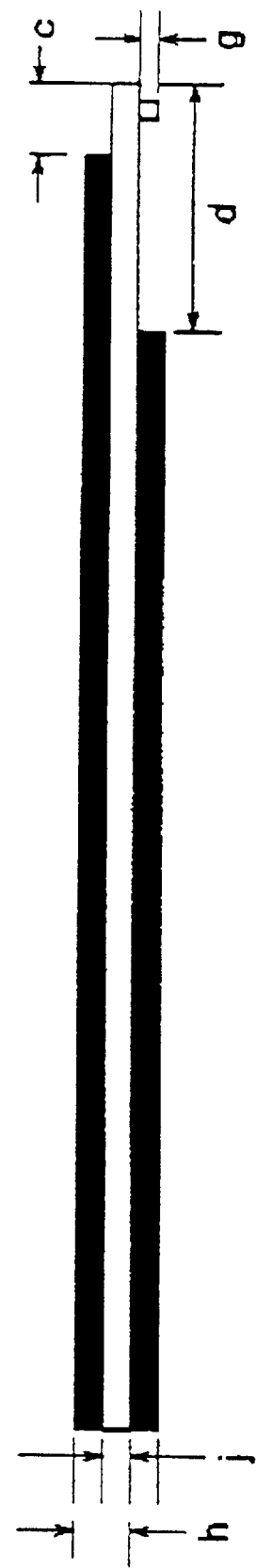
FIG. 4D is a side view illustrative of a dimensions and structure of a positive electrode of a conventional lithium ion secondary in a comparative example to the preferred embodiment in accordance with the present invention.

The dimensions or sizes of the negative electrode 2 illustrated in FIGS. 4C and 4D are as follows.

A length "a" of the negative electrode 2 is 755 millimeters. A width "b" of the negative electrode 2 is 59.1 millimeters. A length "c" of a tub-provided surface of the second part 6b of the negative electrode 2 is 20 millimeters. A length "d" of a tub-free surface of the second part 6b of the negative electrode 2 is 95 millimeters. A length "e" of the tub 7b is about 55 millimeters. A width "f" of the tub 7b is 4 millimeters, A thickness "g" of the tub 7b is 0.1 millimeter. A distance "h" of the tub 7b from a boundary between the active material free second part and the active material coated first part of the positive electrode is about 87 millimeters. A length "i" of a projecting part of the tub 7b from a side of the negative electrode 2 is 3.4 millimeters. A thickness "j" of the metal foil of the negative electrode 2 is 10 micrometers. A total thickness "k" of the negative electrode 2 is 123 micrometers.

The lithium ion secondary battery was fabricated as follows. A separator 3 was prepared which comprises a porous membrane which has a triple-layered structure of polypropylene/polyethylene/polypropylene and has a thickness of 25 micrometers. The above positive and negative electrodes 1 and 2 and the separator 3 were so laminated that the above positive and negative electrodes 1 and 2 are separated by the separator 3. This laminations were in multiple wounded to form a generally rectangle winding shape to form a multiple winding structure. This multiple winding structure was accommodated within a nickel-plated iron can having an external size or dimension of a longitudinal length of 34 millimeters, a height of 65 millimeters and a thickness of 10 millimeters. The electrolyte was prepared by dissolving 1.0 mol/liter of lithium phosphate hexafluoride into a mixture solvent mixing ethylene carbonate and diethyl carbonate at a volume ratio of 3:7. This electrolyte was injected into the can so that the multiple winding structure is immersed into the electrolyte. Thereafter, the can was sealed.

Two kinds of or novel and conventional lithium ion secondary battery were prepared for examinations and comparisons of the characteristics thereof, wherein the novel lithium ion secondary battery has the positive electrode 1 of the metal foil 4a having the active material free second part which is coated with the over-coat material which comprises a polyimide tape having a thickness of 75 micrometers whereby the active material free second part is isolated by the over-coat material from the separator 3, whilst the conventional lithium ion secondary battery has the positive electrode 1 metal foil 4a having the active material free second part which is exposed to the separator 3.

Those novel and conventional lithium ion secondary batteries were subjected to the over-charge test. The charged up novel and conventional lithium ion secondary batteries were placed at an atmosphere of a temperature of 45° C., before a current of 2.5C or 4A was further applied to those batteries for over-charging the batteries, so that variations in voltage level and temperature of those over-charging batteries over time were measured. By over-charging, the voltage level is gradually increased and concurrently the temperature is also risen due to Joule heat.

Figure 5:
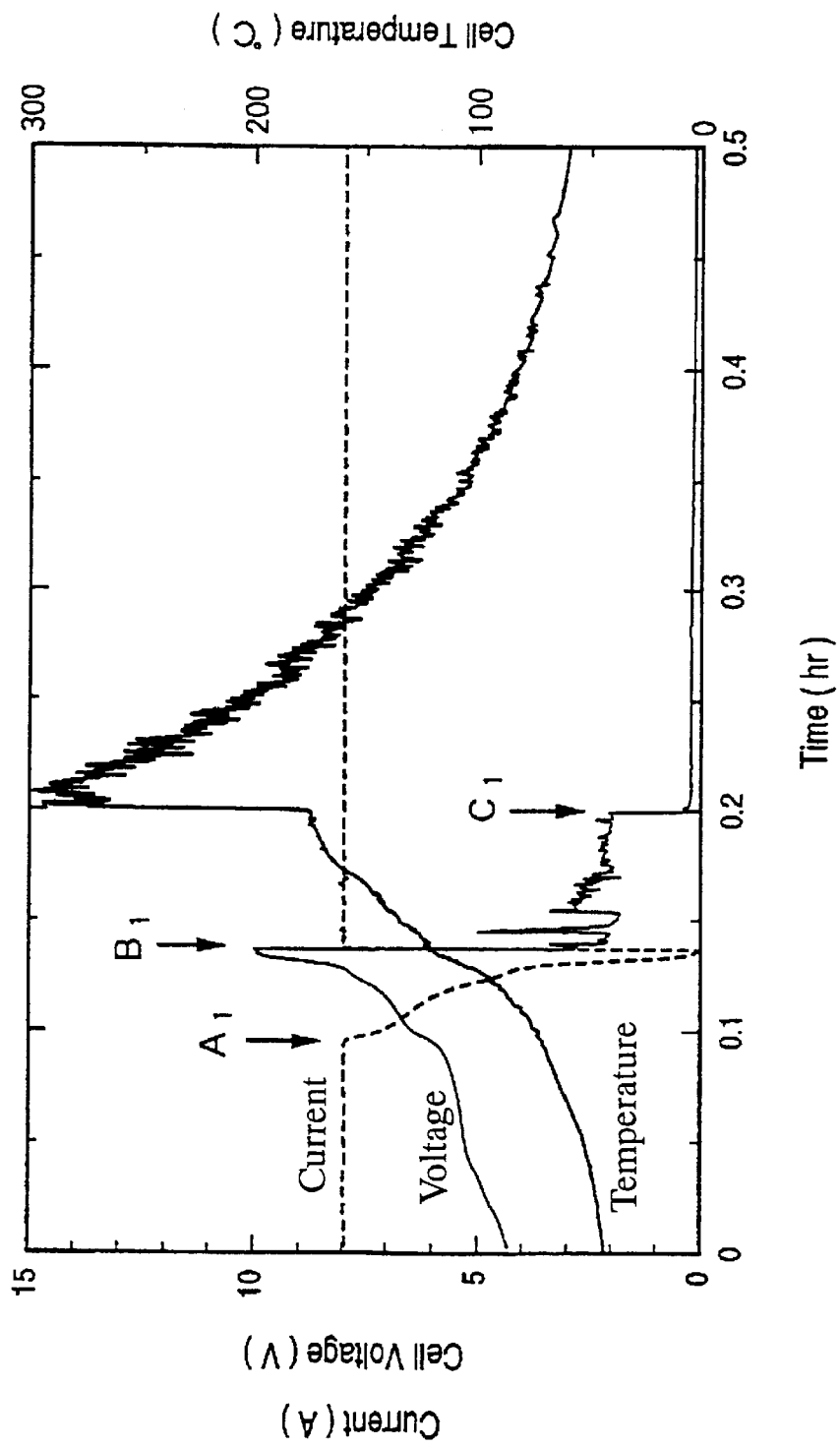
FIG. 5 is illustrative of variations in current and cell voltage level and temperature of the conventional battery over time in a comparative example to the preferred embodiment in accordance with the present invention.

FIG. 5 is illustrative of variations in current and cell voltage level and temperature of the conventional battery over time. A constant current was further applied to the conventional battery and also the cell voltage and the temperature of the conventional battery were gradually increased. When the time was passed and reached a point A1, the temperature of the conventional battery reached the shut down temperature whereby the separator 3 was commenced to show shut down, resulting in rapid increase in resistance of the cell so that the current between the positive and negative electrodes 1 and 2 were discontinued or shut down. The voltage and temperature of the conventional battery were still continued to be increased, wherein the heat transfer appeared to the separator 3 from the active material free and over-coat material free second part 6a of the metal foil 5a of the positive electrode 1, whereby the temperature of the separator 3 was rapidly increased. When the time was passed and reached a point B1, the temperature of the separator 3 reached a melting point of the separator 3, whereby the separator 3 was commenced to be melted and broken thereby forming a short circuit between the positive and negative electrodes 1 and 2. As a result of the short circuit formation, the current again appeared between the positive and negative electrodes 1 and 2. Since the separator was broken, the cell voltage was rapidly dropped down and then varied. However, the temperature of the conventional battery still remained to further increase from the melting point of the separator 3 due to the short circuit current between the positive and negative electrodes 1 and 2. When the time was passed and reached a point C1, an ignition and a smoke were generated due to the further temperature increase by the continuous short circuit current between the positive and negative electrodes 1 and 2. The ignition caused a rapid increase in temperature from the thermo-mnaway temperature.

This conventional battery was then decomposed. It was confirmed that a hole was formed at an adjacent part of the separator 3 to the active material free and over-coat material free second part 6a of the metal foil 4a of the positive electrode 1. Melted part of the separator 3 was adhered on the active material free and over-coat material free second part 6a of the metal foil 4a of the positive electrode 1. However, except for the adjacent part to the active material free and over-coat material free second part 6a, the separator 3 was not melted. The reason why the hole was formed only in the adjacent part of the separator 3 to the active material free and over-coat material free second part 6a would be as follows. A beat transfer rate from the active material free and over-coat material free second part 6a to the adjacent part of the separator 3 is much higher than a heat transfer rate from the active material coated part of the metal foil 4a of the positive electrode 1 to the separator 3 except for the adjacent part to the active material free and overcoat material free second part 6a, for which reason the adjacent part of the separator 3 to the active material free and over-coat material free second part 6a receives the large heat transfer and increases the temperature over the melting point of the separator 3 before the current was shut down. As a result, the adjacent part of the separator 3 to the active material free and over-coat material free second part 6a was melted and the hole was formed in the adjacent part of the separator 3. The melted part of the separator 3 was adhered on the active material free and over-coat material free second part 6a of the positive electrode 1 but not on the negative electrode 2. This means that the heat generation is much larger on the positive electrode 1 rather than on the negative electrode 2.

Figure 6:
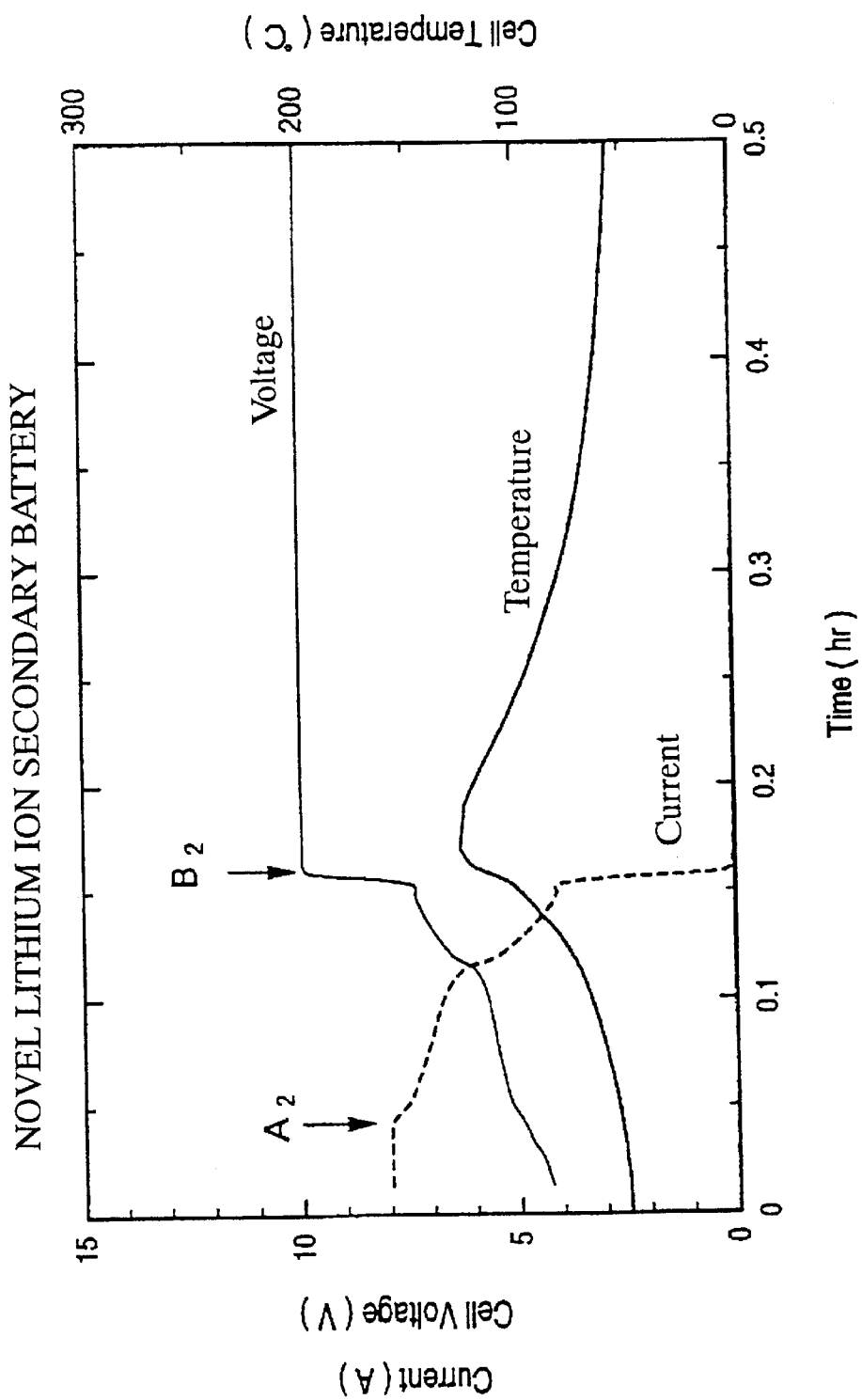
FIG. 6 is illustrative of variations in current and cell voltage level and temperature of the novel lithium ion secondary battery over time in a preferred embodiment in accordance with the present invention.

FIG. 6 is illustrative of variations in current and cell voltage level and temperature of the novel battery over time. A constant current was further applied to the novel battery and also the cell voltage and the temperature of the novel battery were gradually increased. When the time was passed and reached a point A2, the temperature of the novel battery reached the shut down temperature whereby the separator 3 was commenced to show shut down, resulting in rapid increase in resistance of the cell so that the current between the positive and negative electrodes 1 and 2 were discontinued or shut down. The voltage and temperature of the novel battery were still continued to be increased, wherein a slight heat transfer appeared to the separator 3 from the active material free and over-coat material coated second part 6a of the metal foil 5a of the positive electrode 1, whereby the temperature of the separator 3 was gradually increased. When the time was passed and reached a point B2, the current between the positive and negative electrodes 1 and 2 have become zero, whereby the temperature of the battery was decreased gradually without rising up to a melting point of the separator 3, whereby the separator 3 was not melted nor broken thereby forming no short circuit between the positive and negative electrodes 1 and 2. As a result of no short circuit formation, no further current appeared between the positive and negative electrodes 1 and 2. Since the separator 3 was not broken, the cell voltage was remains constant. However, the temperature of the novel battery decreased gradually. As a result, no ignition nor smoke were generated due to no further temperature increase by discontinuation of short circuit current between the positive and negative electrodes 1 and 2. No ignition caused no increase in temperature up to the thermo-runaway temperature.

This novel battery was then decomposed. It was confirmed that no hole was formed on the separator 3. The separator 3 was not melted. The reason why no hole was formed in the adjacent part of the separator 3 to the active material free and over-coat material coated second part 6a would be as follows. A heat transfer rate from the active material free and over-coat material coated second part 6a to the adjacent part of the separator 3 is lower than a heat transfer rate from the active material coated part of the metal foil 4a of the positive electrode 1 to the separator 3 except for the adjacent part to the active material free and over-coat material coated second part 6a, for which reason the adjacent part of the separator 3 to the active material free and over-coat material coated second part 6a receives less heat transfer and does not increase the temperature over the melting point of the separator 3 before the current was shut down. As a result, the adjacent part of the separator 3 to the active material free and over-coat material coated second part 6a was not melted and no hole was formed in the adjacent part of the separator 3.

Those examination or text results prove the fact that the over-coat material has the following properties of: suppression of heat transfer from the active material free second part 6a of the positive electrode 1 to the adjacent part of the separator 3; reduction of a heat transfer rate from the active material free second part 6a of the positive electrode 1 to the separator 3; prevention of transfer of excess heat from the active material free second part 6a of the positive electrode 1 to the separator 3; electrical isolation of the active material free second part 6a of the positive electrode 1 from the separator 3; prevention of charges generated in the first active material 5a from becoming concentrated in the active material free second part 6a of the positive electrode 1 and discharged from the active material free second part 6a; and prevention of the separator 3 from being melted by a current discharge from or into the active material free second part 6a of the positive electrode 1 through the separator 3 until the current between the positive and negative electrodes 1 and 2 is shut down by a fuse function of the separator 3. The novel lithium ion secondary battery is free from the problem with a possibility of ignition.

In place of polyimide, PPS and PP were used for the over-coat material 12. The same test and examinations were carried out. It could be confirmed that the same results were obtained as when the polyimide was used for the over-coat material.

As a modification, the over-coat material may be provided not only on the positive electrode 1 but also on the negative electrode 2. Notwithstanding, it is essential to provide the over-coat material on the active material free positive electrode part.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An electrode structure comprising:
    a first part coated with a first active material and a second part connected to an electrode terminal and not coated with the first active material;
    an over-coat material coating said second part of said electrode and not coating said first part; and
    an electrode pad on said second part,
    wherein the electrode terminal extends from said electrode pad and wherein said over-coat material covers said electrode pad and a portion of said electrode terminal,
    wherein said over-coat material suppresses heat transfer from said second part of said electrode to an adjacent separator through an inter-space.

2. The electrode structure as claimed in claim 1, wherein said over coat material reduces a heat transfer rate from said second part of said electrode to said separator through said inter-space.

3. The electrode structure as claimed in claim 1, wherein said over coat material prevents transfer of excess heat from said second part of said electrode to said separator through said inter-space.

4. The electrode structure as claimed in claim 1, wherein said over coat material electrically isolates said second part of said electrode from said separator.

5. The electrode structure as claimed in claim 1, wherein said over coat material prevents charges generated in said first active material from becoming concentrated in said second part of said electrode and discharged from said second part.

6. The electrode structure as claimed in claim 1, wherein said over coat material prevents said separator from being melted by a current discharge from or into said second part of said electrode through said separator until said current discharge is shut down by a fuse function of said separator.

7. The electrode structure as claimed in claim 1, wherein said first active material comprises a lithium manganate having a spinel structure.

8. The electrode structure as claimed in claim 1, wherein said electrode comprises a metal foil.

9. An explosion-resistant secondary battery having at least one positive electrode, at least one negative electrode and at least one separator separating said positive electrode from said negative electrode,
    wherein at least said positive electrode has an electrode structure as claimed in claim 1.

10. The explosion-resistant secondary battery as claimed in claim 9, further comprising a spiral structure of laminations of said positive electrode, said separator and said negative electrode which are sheet-shaped, so that said second part of said positive electrode has a positive electrode terminal tub connected to a positive electrode terminal and said positive electrode terminal tub is positioned at an innermost spiral position, and said over-coat material is disposed between said second part and said separator surrounding said second part.

11. The explosion-resistant secondary battery as claimed in claim 10, wherein said negative electrode comprises a third part coated with a second active material and a fourth part having a negative electrode terminal tub connected to a negative electrode terminal and said negative electrode terminal tub is positioned at an outermost spiral position.

12. An electrode structure comprising:
    a first part coated with a first active material and a second part connected to an electrode terminal and not coated with the first active material;

an over-coat material coating said second part of said electrode and not coating said first part; and an electrode pad on said second part, wherein the electrode terminal extends from said electrode pad and wherein said over-coat material covers said electrode pad and a portion of said electrode terminal, and wherein said over-coat material has at least one of the following properties:

suppression of heat transfer from said second part of said electrode to said separator;

reduction of a heat transfer rate from said second part of said electrode to said separator;

prevention of transfer of excess heat from said second part of said electrode to said separator;

electrical isolation of said second part of said electrode from said separator;

prevention of charges generated in said first active material from becoming concentrated in said second part of said electrode and discharged from said second part; and prevention of said separator from being melted by a current discharge from or into said second part of said electrode through said separator until said current discharge is shut down by a fuse function of said separator.

13. The electrode structure as claimed in claim 12, wherein said first active material comprises a lithium manganate having a spinel structure.

14. The electrode structure as claimed in claim 12, wherein said electrode comprises a metal foil.

15. An explosion-resistant secondary battery having at least one positive electrode, at least one negative electrode and at least one separator separating said positive electrode from said negative electrode, wherein at least said positive electrode has an electrode structure as claimed in claim 12.

16. The explosion-resistant secondary battery as claimed in claim 15, further comprising a spiral structure of laminations of said positive electrode, said separator and said negative electrode which are sheet-shaped, so that said second part of said positive electrode has a positive electrode terminal tub connected to a positive electrode terminal and said positive electrode terminal tub is positioned at an innermost spiral position, and said over-coat material is disposed between said second part and said separator surrounding said second part.

17. The explosion-resistant secondary battery as claimed in claim 16, wherein said negative electrode comprises a third part coated with a second active material and a fourth part having a negative electrode terminal tub connected to a negative electrode terminal and said negative electrode terminal tub is positioned at an outermost spiral position.

* * * * *